(12) United States Patent
Koizumi et al.

(10) Patent No.: US 7,629,568 B2
(45) Date of Patent: Dec. 8, 2009

(54) PHOTOELECTRIC CONVERSION APPARATUS HAVING A RESET UNIT FOR COMMON SIGNAL LINES AND IMAGE PICKUP SYSTEM USING THE APPARATUS

(75) Inventors: Toru Koizumi, Yokohama (JP); Hideaki Takada, Yokohama (JP); Masanori Ogura, Atsugi (JP); Seiichirou Sakai, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/325,307

(22) Filed: Dec. 1, 2008

(65) Prior Publication Data
US 2009/0159783 A1 Jun. 25, 2009

(30) Foreign Application Priority Data
Dec. 20, 2007 (JP) ............................. 2007-328724

(51) Int. Cl.
*H01J 40/14* (2006.01)
(52) U.S. Cl. ................................ 250/214 R; 250/208.1
(58) Field of Classification Search ............. 250/214 R, 250/208.1, 208.2; 396/108–111, 125; 348/297–311, 348/231.6
See application file for complete search history.

(56) References Cited

U.S. PATENT DOCUMENTS

| 4,663,669 | A | 5/1987 | Kinoshita et al. ...... 358/213.19 |
|---|---|---|---|
| 4,774,585 | A | 9/1988 | Suga et al. ............. 358/213.19 |
| 5,998,779 | A | 12/1999 | Kozuka .................... 250/208.1 |
| 6,188,094 | B1 | 2/2001 | Kochi et al. .................. 257/232 |
| 6,670,990 | B1 | 12/2003 | Kochi et al. .................. 348/310 |
| 6,960,751 | B2 | 11/2005 | Hiyama et al. ........... 250/208.1 |
| 7,016,089 | B2 | 3/2006 | Yoneda et al. ............. 358/482 |
| 7,110,030 | B1 | 9/2006 | Kochi et al. .................. 348/308 |
| 7,321,110 | B2 | 1/2008 | Okita et al. .............. 250/208.1 |
| 7,324,144 | B1 | 1/2008 | Koizumi ..................... 348/294 |
| 7,382,409 | B2 * | 6/2008 | Hiyama et al. .............. 348/308 |
| 7,429,764 | B2 | 9/2008 | Koizumi et al. ............. 257/292 |
| 7,460,162 | B2 | 12/2008 | Koizumi et al. ............. 348/294 |
| 2003/0141436 | A1 | 7/2003 | Koizumi et al. ........... 250/208.1 |
| 2006/0043440 | A1 | 3/2006 | Hiyama et al. .............. 357/291 |
| 2008/0024630 | A1 | 1/2008 | Hiyama et al. .............. 348/241 |
| 2008/0036891 | A1 | 2/2008 | Ono et al. .................... 348/308 |
| 2008/0062294 | A1 | 3/2008 | Koizumi et al. ............. 348/300 |
| 2008/0062295 | A1 | 3/2008 | Fujimura et al. ............ 348/301 |
| 2008/0062296 | A1 | 3/2008 | Ogura et al. ................. 348/308 |
| 2008/0211948 | A1 | 9/2008 | Kikuchi et al. .............. 348/302 |

FOREIGN PATENT DOCUMENTS

| JP | 10-191173 A | 7/1998 |
|---|---|---|
| JP | 2003-224776 A | 8/2003 |

* cited by examiner

*Primary Examiner*—Que T Le
(74) *Attorney, Agent, or Firm*—Fitzpatrick, Cella, Harper & Scinto (57) ABSTRACT

A photoelectric conversion apparatus includes a first block line through which an optical signal is output and a second block line through which a noise signal superimposed on the optical signal is output. The photoelectric conversion apparatus also includes a switch used to control a connection between the fist block line and the second block line.

9 Claims, 7 Drawing Sheets

PHOTOELECTRIC CONVERSION APPARATUS HAVING A RESET UNIT FOR COMMON SIGNAL LINES AND IMAGE PICKUP SYSTEM USING THE APPARATUS

FIELD OF THE INVENTION

The present invention relates to a photoelectric conversion apparatus and, more particularly, to a signal readout circuit.

BACKGROUND OF THE INVENTION

Description of the Related Art

Photoelectric conversion apparatuses have been widely used in digital cameras in recent years. Typical types of photoelectric conversion apparatuses include charge coupled device (CCD)-type photoelectric conversion apparatuses and metal oxide semiconductor (MOS)-type photoelectric conversion apparatuses. A typical MOS-type photoelectric conversion apparatus includes a pixel unit with photoelectric conversion elements, such as photodiodes, a signal storage unit that stores signals supplied from the pixel unit, and common signal lines (horizontal signal lines) through which signals from the signal storage unit are externally output.

The photoelectric conversion apparatuses have increased in size and in the number of pixels, and the number of switch transistors and the length of the signal lines also have increased along with the increase in size and in the number of pixels. Accordingly, the line capacitance including the parasitic capacitance of the common signal lines have tended to increase. In addition, an increase in the speed of signal readout is required to accommodate the increase in the number of pixels. The speed of the signal readout is affected by a reset operation of the common signal lines and the line capacitance of the common signal lines. The reset of the common signal lines means that the voltages of the signal lines are set to predetermined voltages before or after signals are read out from the signal lines.

Japanese Patent Laid-Open No. 2003-224776 discloses a photoelectric conversion apparatus configured such that a signal supplied from the pixel unit is read out into a corresponding block line and, then, is supplied to a corresponding common signal line in order to reduce a line capacitance of the common signal line.

As for the reset operation of common signal lines, Japanese Patent Laid-Open No. 10-191173 discloses a configuration including a switch that connects multiple common signal lines to each other.

SUMMARY OF THE INVENTION

The present invention provides, in an aspect thereof, a photoelectric conversion apparatus capable of performing a reset operation at high speed.

According to an embodiment of the present invention, a photoelectric conversion apparatus includes a plurality of photoelectric conversion elements; a plurality of signal lines to which signals from the plurality of photoelectric conversion elements are output; a signal storage group including signal storage devices configured to store the signals output to the plurality of signal lines; a plurality of common signal lines to which the signals in the signal storage group are output; a plurality of block lines to which the signals from signal storage devices included in each block are read out; a plurality of switches used to transfer the signals read out from the plurality of block lines to corresponding ones of the plurality of common signal lines; and a reset unit configured to reset a voltage of the plurality of common signal lines to a reset voltage. The signal storage group is grouped into a first signal storage block that includes signal storage devices storing signals based on electric charge generated in the plurality of photoelectric conversion elements and a second signal storage block that includes signal storage devices storing signals superimposed on the signals based on the electric charge generated in the plurality of photoelectric conversion elements. The plurality of block lines includes a first block line to which signals from the signal storage devices in the first signal storage block are output and a second block line to which signals from the signal storage devices in the second signal storage block are output. The plurality of common signal lines includes a first common signal line to which the signals from the first block line are output and a second common signal line to which the signals from the second block line are output. The plurality of switches includes a first switch with which the first block line is connected to the first common signal line and a second switch with which the second block line is connected to the second common signal line. The photoelectric conversion apparatus further includes a switch used to control a connection between the first block line and the second block line.

According to another embodiment of the present invention, a photoelectric conversion apparatus includes photoelectric conversion elements; a first signal readout unit including a first signal storage block that includes a plurality of memories for storing signals based on electric charge generated in the photoelectric conversion elements, a first switch block that includes switches connected to the plurality of memories in the first signal storage block, a first signal line block that includes signal lines to which the switches in the first switch block are connected, a second signal line, and a second switch block that includes switches with which the signal lines in the first signal line block are connected to the second signal line, the signals stored in the plurality of memories in the first signal storage block being selectively read out to the second signal line through the switches in the first switch block, the signal lines in the first signal line block, and the switches in the second switch block; a second signal readout unit including a second signal storage block that includes a plurality of memories for storing noise signals superimposed on the signals based on the electric charge generated in the photoelectric conversion elements, a third switch block that includes switches connected to the plurality of memories in the second signal storage block, a third signal line block that includes signal lines to which the switches in the third switch block are connected, a fourth signal line, and a fourth switch block that includes switches with which the signal lines in the third signal line block are connected to the fourth signal line, the signals stored in the plurality of memories in the second signal storage block being selectively read out to the fourth signal line through the switches in the third switch block, the signal lines in the third signal line block, and the switches in the fourth switch block; a reset unit configured to reset a voltage of the second signal line and the fourth signal line to a reset voltage; and a fifth switch block that includes switches used to control a connection between the signal lines in the first signal line block and the signal lines in the third signal line block.

According to another embodiment of the present invention, a photoelectric conversion apparatus is incorporated in an image pickup system that includes an image processing unit configured to process an image signal output from the photoelectric conversion apparatus.

Further features of the present invention will become apparent from the following description of exemplary embodiments with reference to the attached drawings.

The accompanying drawings, which are incorporated in and constitute a part of the specification, illustrate embodiments of the invention and, together with the description, serve to explain the principles of the described embodiments of the invention.

DESCRIPTION OF THE EMBODIMENTS

Configurations capable of reducing line capacitance of common signal lines have been discussed. However, a discussion of resetting methods, specifically, a discussion of resetting operations of block lines has not been sufficiently held. It is not sufficient only to reduce the line capacitance of the common signal lines in some cases in order to increase the number of pixels and the speed of signal readout. Accordingly, the present invention, according to aspects thereof, provides a photoelectric conversion apparatus capable of performing a reset operation at high speed.

A photoelectric conversion apparatus according to an embodiment of the present invention includes a first signal storage block for storing signals based on photoelectric conversion and a second signal storage block for storing noise signals superimposed on the signals. The photoelectric conversion apparatus also includes a first block line through which signals from signal storage devices in the first signal storage block are output, a second block line through which signals from signal storage devices in the second signal storage block are output, and common signal lines through which signals from the first and second block lines are output. The photoelectric conversion apparatus having the above configuration further includes a switch used to control a connection between the first block line and the second block line. With the above configuration, it is possible to perform a reset operation to reset a voltage of the block lines to a predetermined voltage at high speed.

In the reset operation, the voltages of the common signal lines and the block lines are reset to a predetermined voltage (reset voltage) to discharge the electric charge generated in the common signal lines and the block lines to a power supply or the like. Because the reset signal has an amplitude smaller than that of the signals based on the electric charge of the photoelectric conversion elements and has a substantially constant value, it takes a shorter time to perform the reset operation. Specifically, the second block line described above can be reset in a relatively short time. However, the amplitude of the signals based on the electric charge of the photoelectric conversion elements is larger than that of the reset signal and, therefore, the increased amount of electric charge is generated in the common signal lines and the block lines to output the signals. In other words, it takes a longer time to perform the reset operation of the first block line, compared with the reset operation of the second block line. The establishment of the connection between the lines from which a larger amount of electric charge is discharged and the lines for which the reset operation can be performed in a short time allows the resistance of the lines to be reduced, so that the reset operation can be performed in a short time.

In addition, provision of a reset unit for resetting the voltage of the common signal lines to the reset voltage for the common signal lines allows the voltage of the block lines to be rapidly reset to the reset voltage. Consequently, an image signal can be stably read out to improve the quality of the image.

Figure 6:
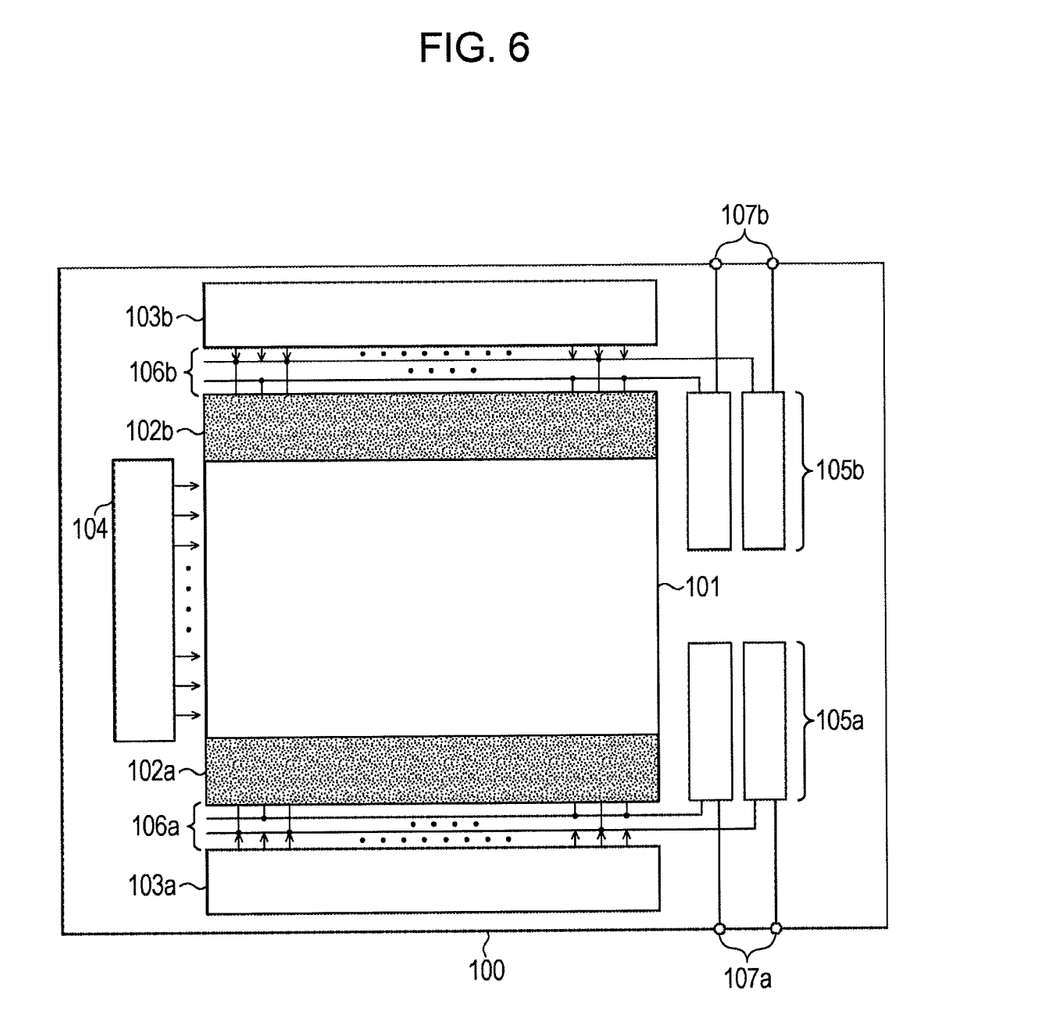
FIG. 6 is a schematic plan view of a photoelectric conversion apparatus according to an embodiment of the present invention.

First, an example of a configuration of a photoelectric conversion apparatus will now be described with reference to FIG. 6. FIG. 6 is a schematic view for description of a photoelectric conversion apparatus 100. Referring to FIG. 6, reference numeral 101 denotes a pixel unit in which pixels that include photoelectric conversion elements are two-dimensionally arrayed, and reference numerals 102a and 102b denote readout circuit portions that read out signals from the pixel unit 101. The signals read out from the pixel unit 101 are distributed to the readout circuit portions 102a and 102b, which have the same configuration. The signals output from the readout circuit portions 102a and 102b are supplied to common signal line portions 106a and 106b and are output from output terminal portions 107a and 107b through readout amplification portions 105a and 105b, respectively. The readout circuit portions 102a and 102b, the readout amplification portions 105a and 105b, and the common signal line portions 106a and 106b are collectively referred to as a signal readout unit. Reference numerals 103a and 103b denote horizontal scanning circuit units and reference numeral 104 denotes a vertical scanning circuit unit. The horizontal scanning circuit units 103a and 103b and the vertical scanning circuit unit 104 control readout of signals from the pixel unit 101. When it is not necessary to discriminate between the readout circuit portions 102a and 102b, between the horizontal scanning circuit units 103a and 103b, between the readout amplification portions 105a and 105b, between the common signal line portions 106a and 106b, and between the output terminal portions 107a and 107b, they are denoted by: a readout circuit 102, a horizontal scanning circuit 103, a readout amplifier 105, a common signal line 106, and a output terminal 107, respectively, in this specification.

Embodiments of the present invention will herein be described in detail with reference to the attached drawings.

First Exemplary Embodiment

Figure 1:
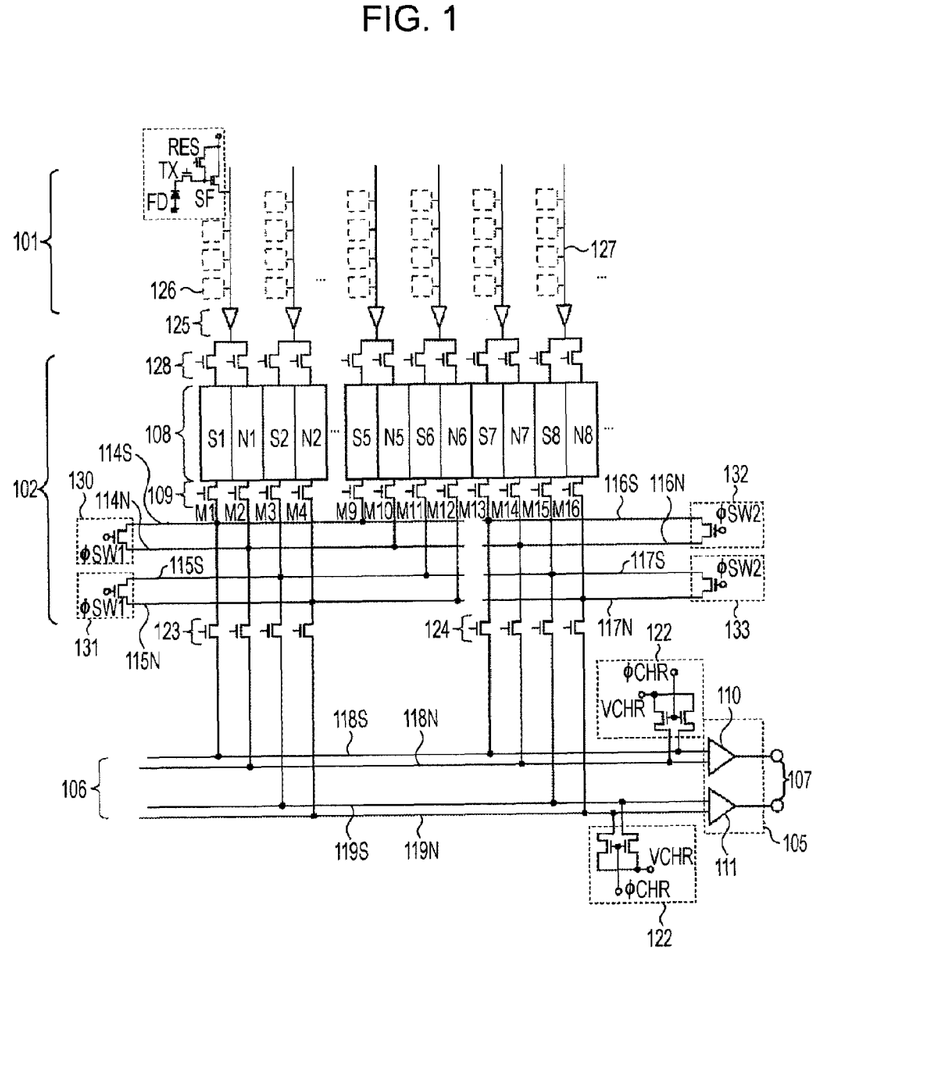
FIG. 1 is a schematic view of a photoelectric conversion apparatus according to a first exemplary embodiment of the present invention.

A photoelectric conversion apparatus according to a first exemplary embodiment of the present invention will now be described with reference to FIG. 1. The pixel unit 101, the readout circuit 102, the readout amplifier 105, the common signal line 106, and the output terminal 107 in FIG. 6 are illustrated in FIG. 1. Only the path through which signals are supplied to the output terminal 107a of FIG. 6 is shown in FIG. 1 for simplicity.

Multiple pixels 126 are arrayed in the pixel unit 101. Each pixel 126 includes a photodiode PD, which is a photoelectric conversion element, and a transfer MOS transistor TX, which transfers electric charge from the photoelectric conversion element. The pixel 126 also includes a floating diffusion area FD to which the electric charge is transferred from the photoelectric conversion element and a reset MOS transistor RES that resets the FD and the PD. The pixel 126 further includes an amplification MOS transistor SF that outputs a signal based on the electric charge transferred to the FD. Signals output from the multiple pixels 126 having the above-described configuration are supplied to vertical output lines 127. Groups of the multiple pixels 126 are connected to the vertical output lines 127, respectively per group, and thus multiple vertical output lines 127 are provided.

The signals output from the vertical output lines 127 are supplied to the readout circuit 102. In the readout circuit 102, a column amplifier portion 125 includes column amplifiers provided for each vertical output line 127 and each column amplifier may include clamping circuits. The signals amplified by the column amplifiers in the column amplifier portion 125 are stored in a memory group 108. Two memories of the memory group 108 are provided for every vertical output line 127. For example, memories S1 and N1 are provided for one vertical output line 127. A switch group 128 includes switches used to input and store signals in the memories of the memory group 108. A switch group 109 includes switches used to output signals from the memories of the memory group 108. The signals from the memories of the memory group 108 are supplied to block lines through the switches in the switch group 109. In other words, the switch group 128, the memory group 108, the switch group 109, and the block lines are connected in this order. For example, a signal from the memory S1 in the memory group 108 is supplied to a block line 114S through the switch M1 in the switch group 109 and a signal from the memory S5 in the memory group 108 is supplied to the block line 114S through the switch M9 in the switch group 109. The photoelectric conversion apparatus shown in FIG. 1 includes eight block lines 114S, 115S, 116S, 117S, 114N, 115N, 116N, and 117N. The output terminals of the switches in the switch group 109 are connected to corresponding block lines to which the signals from the memories of the memory group 108 are selectively output.

The signals output from the readout circuit 102 are supplied to the common signal line 106 and the signals from the common signal line 106 are output from the output terminal 107 through the readout amplifier 105. Four common signal lines 118S, 118N, 119S, and 119N are shown in the common signal line 106 in FIG. 1. Each block line is connected to one common signal line via a switch group 123 or 124. For example, the signals from the block lines 114S and 116S are supplied to the common signal line 118S. In other words, the input terminal of each switch in the switch groups 123 and 124 is connected to the output terminal of the corresponding switch in the switch group 109.

The configuration to the common signal lines (signal readout unit) will now be described. The photoelectric conversion apparatus according to the first exemplary embodiment includes a first signal readout unit, which is a path through which the signals from the memory S1, etc., are output, and a second signal readout unit, which is a path through which the signals from the memory N1, etc., are output. Specifically, the first signal readout unit includes a first signal storage block (the memories S1, S2, etc.), a first switch block (part of the switch group 109), a first signal line block (block lines 114S, 116S, etc.), a second switch block (part of the switch group 123 or 124), and a second signal line block (the common signal line 118S, etc.). The second signal readout unit includes a second signal storage block (the memories N1, N2, etc.), a third switch block (part of the switch group 109), a third signal line block (the block lines 114N, 116N, etc.), a fourth switch block (part of the switch group 123 or 124), and a fourth signal line block (the common signal line 118N, etc.). The blocks in the first and second signal readout units are arranged in the described order.

A difference between the signals from the common signal lines 118S and 118N is output from a readout amplifier 110 and a difference between the signals from the common signal lines 119S and 119N is output from a readout amplifier 111. Reset units 122 are used for a reset operation to reset a voltage of each common signal line to a predetermined voltage. Each reset unit 122 includes a MOS transistor, according to the first exemplary embodiment. The above configuration with the block lines allows the number of switches connected to the common signal lines to be reduced. As a result, it is possible to reduce the line capacitance of the common signal lines and to speed up the signal readout and the reset operation of the common signal lines.

The readout of signals from the pixels 126 in such a photoelectric conversion apparatus will now be described. An optical signal based on the electric charge generated in the PD and a reset signal that includes noise components superimposed on the optical signal when the PD and the FD are reset are output from each pixel 126 according to the first exemplary embodiment. The optical signal and the reset signal superimposed on the optical signal are clamped (using the calculated difference between the optical signal and the reset signal) by a capacitance Co at the input stage of the corresponding column amplifier in the column amplifier portion 125 and the signal subjected to the clamping is output from the column amplifier portion 125. The signal supplied from the column amplifier portion 125 that is in the reset state, that is, the signal that is based on a reference voltage Vref and that includes an offset component in the column amplifier portion 125, is stored in the memory N1. The optical signal for which the difference is calculated in the column amplifier portion 125 and the offset component in the column amplifier portion 125 superimposed on the optical signal are stored in the memory S1. The signal stored in the memory S1 is supplied to the readout amplifier 110 through the block line 114S and the common signal line 118S. The signal stored in the memory N1 is supplied to the readout amplifier 110 through the block line 114N and the common signal line 118N. Then, the difference between the signal stored in the memory S1 and the signal stored in the memory N1 is calculated to output the optical signal from which the noise component, such as the offset component in the column amplifier portion 125, is excluded.

Here, the optical signal is referred to as an S signal and the noise component superimposed on the S signal is referred to as an N signal. Final exclusion of the N signal from the S signal generates an image signal. The N signal is, for example, a reset signal for a pixel, the offset component in the column amplifier portion, or a signal including the reset signal for the pixel and the offset component in the column amplifier portion. In the memory group 108, reference letter "S" is added to the identifications of the memories storing the signals including the optical signals and reference letter "N" is added to the identifications of the memories storing the signals including, for example, the offset component in the column amplifier portion. The numbers added to the identifications of the memories of the memory group 108 represents the column numbers, such as the 1st column and the 2nd column, of the vertical output lines. Also in the identifications of the block lines, reference letter "S" indicates that the S signal is transferred through the block line and the reference letter "N" indicates that the N signal is transferred through the block line. Specifically, the block lines for the optical signals include 114S, 115S, 116S, and 117S and the block lines for the noise signals include 114N, 115N, 116N, and 117N. The N signal is not restricted to the offset component of the column amplifier portion and may be, for example, the noise component of a pixel.

According to the first exemplary embodiment, connection switches 130, 131, 132, 133 (a fifth switch block) are provided to control a connection between the paired block lines through which the paired signals for which the difference is calculated are output. For example, the connection switch 130 controls the connection between the block line 114S and the block line 114N. Turning on the connection switches 130, 131, 132, and 133 establishes the connections between the paired block lines to apply the same voltage to the paired block lines. In addition, turning on the connection switches 130, 131, 132, and 133 while the common signal lines are reset by the reset unit 122 provided for the common signal lines allows the resistance from the reset unit 122 to the block lines to be decreased. In other words, the connection switches 130, 131, 132, and 133 establish the connections between the input terminals of the paired switches in the switch groups 123 and 124. Accordingly, it is possible to reduce the time necessary for the reset operation. Furthermore, because the block line through which the S signal is output can be connected to the block line through which the N signal is output to discharge the electric charge of the S signal by using the two block lines, it is possible to perform the reset operation at high speed.

Figure 2A:
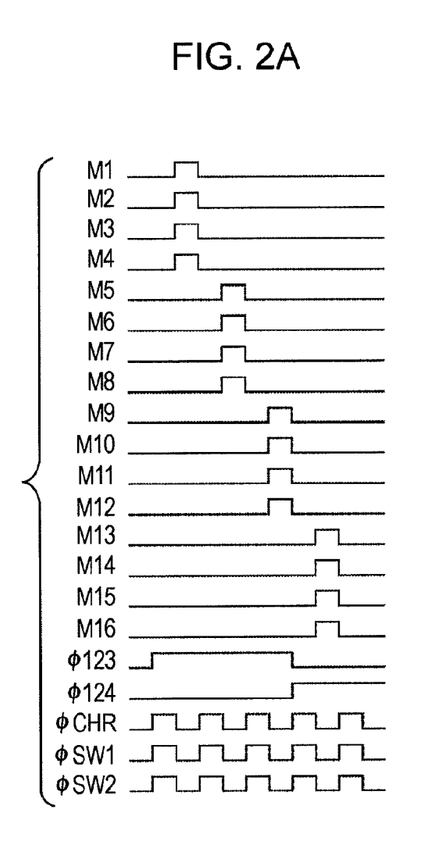
FIGS. 2A and 2B illustrate drive pulses for descriptions of the first exemplary embodiment and a second exemplary embodiment of the present invention.

How the photoelectric conversion apparatus having the configuration shown in FIG. 1 is driven will now be described with reference to a pulse diagram shown in FIG. 2A. Referring to FIG. 2A, reference numerals M1 to M10 denote drive pulses input to the switches M1 to M10, respectively, in the switch group 109 in FIG. 1. When the pulses M1 to M10 become high, the corresponding switches M1 to M10 are turned on and a signal is supplied from each memory in the memory group 108 to the corresponding block line. Reference numerals φ123 and φ124 denote drive pulses input to the switch groups 123 and 124, respectively. When the pulses φ123 and φ124 become high, the corresponding switch groups 123 and 124 are turned on. Reference numeral φCHR denotes a drive pulse input to each reset unit 122. Reference numeral φSW1 denotes a drive pulse input to the connection switches 130 and 131, and reference numeral φSW2 denotes a drive pulse input to the connection switches 132 and 133. The drive pulse φCHR is driven in synchronization with the drive pulses φSW1 and φSW2 in the first exemplary embodiment.

How signals are read out will now be described on the basis of the drive pulses described above. Because the switches M1 to M4 are turned on when the pulses M1 to M4 become high and the drive pulse φ123 also becomes high at this time, the switch group 123 is turned on. In other words, the signals from the memories S1, N1, S2, and N2 are transferred to the block lines 114S, 114N, 115S, and 115N, respectively, through the switch group 109. The signals transferred to the block lines 114S, 114N, 115S, and 115N are supplied to the first common signal line 118S, the second common signal line 118N, the third common signal line 119S, and the fourth common signal line 119N, respectively, through the switch group 123. Subsequently, the signals supplied from the memory group 108 are selectively output at times when the drive pulses M5 to M8, the drive pulses M9 to M12, and the drive pulses M13 to M16 become high. When the drive pulses M13 to M16 become high, the switches M13 to M16 are turned on and the signals are supplied from the memories S7, N7, S8, and N8 to the block lines 116S, 116N, 117S, and 117N, respectively. Because the drive pulse φ124 also becomes high at this time, the signals are supplied from the block lines 116S, 116N, 117S, and 117N to the first to fourth common signal lines 118S, 118N, 119S, and 119N, respectively. These paired signals are differentially amplified by the readout amplifiers 110 and 111 in the readout amplifier 105 and are output through the output terminal 107.

When the drive pulse φCHR becomes high, the reset unit 122 provided for the first and second common signal lines 118S and 118N and the reset unit 122 provided for the third and fourth common signal lines 119S and 119N are activated to reset the common signal lines to a reset voltage VCHR. The drive pulse φCHR becomes high when the drive pulses M1 to M16 are in the low state. In other words, the drive pulse φCHR does not become high while the signals are output. Because the drive pulse φSW1 becomes high in synchronization with the drive pulse φCHR, the connection switch 130 with which the block line 114S is connected to the block line 114N and the connection switch 131 with which the block line 115S is connected to the block line 115N are turned on. Furthermore, because the drive pulse φSW2 also becomes high in synchronization with the drive pulse φCHR, the connection switch 132 with which the block line 116S is connected to the block line 116N and the connection switch 133 with which the block line 117S is connected to the block line 117N are turned on. Because either the drive pulse φ123 or the drive pulse φ124 is in the high state, the reset voltage VCHR of the common signal lines is supplied to the block lines through the switch group 123 or 124. Because the drive pulse φSW1 or SW2 also becomes high in synchronization with the supply of the reset voltage VCHR, the connection is established between the paired block lines. Accordingly, it is possible to rapidly reset any of the block lines on the basis of the reset voltage. Because there is no need to provide a reset unit for the block lines themselves, it is possible to reduce the size of the photoelectric conversion apparatus. It is sufficient for the drive pulse φSW1 or φSW2 to have a period during which the drive pulse φSW1 or φSW2 becomes high in synchronization with the drive pulse φCHR at least after the signals are read out.

Even if the offset component remains for the reset voltage in each block line, the difference can be calculated to cause no problem because a connection is established between the paired block lines and the same offset component remains in the paired block lines.

With the configuration described above, it is possible to reduce the reset time to about 25% of the time necessary when the switches connecting the block lines are not provided.

Second Exemplary Embodiment

Figure 2B:
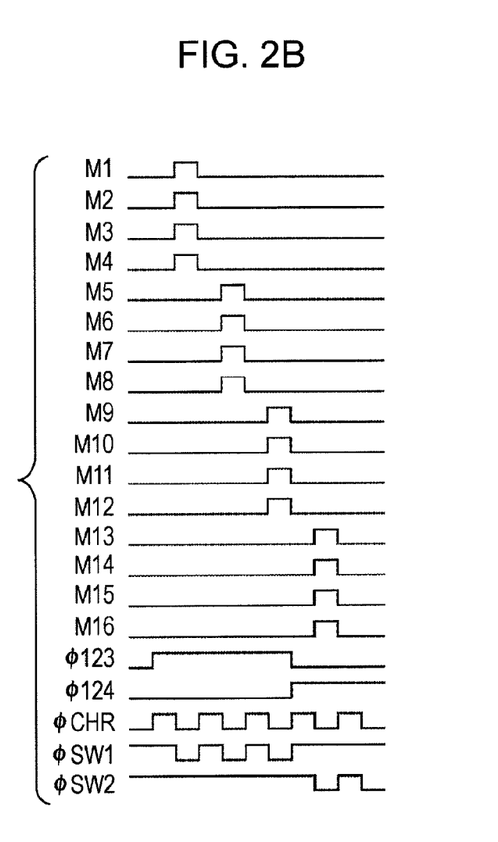

A second exemplary embodiment of the present invention will now be described with reference to FIG. 2B. FIG. 2B is a pulse diagram in a case where the photoelectric conversion apparatus according to the first exemplary embodiment is driven in a manner different from that in the first exemplary embodiment. The second exemplary embodiment differs from the first exemplary embodiment in the manner in which the connection switches 130, 131, 132, and 133 are driven. The time when the pulse drives φSW1 and φSW2 become high in the second exemplary embodiment is longer than that in the first exemplary embodiment.

Specifically, while no signal is supplied to the block lines 116S, 116N, 117S, and 117N, the drive pulse φSW2 becomes high and the connection is established between the paired block lines. In this manner, it is possible to provide enough time to keep the voltage of the paired block lines at a constant value. While no signal is supplied to the block lines 114S, 114N, 115S, and 115N, the drive pulse φSW1 becomes high and the same operation can be performed.

According to the second exemplary embodiment, it is possible to provide enough time for the reset operation of the block lines while no signal is supplied.

Third Exemplary Embodiment

Figure 3:
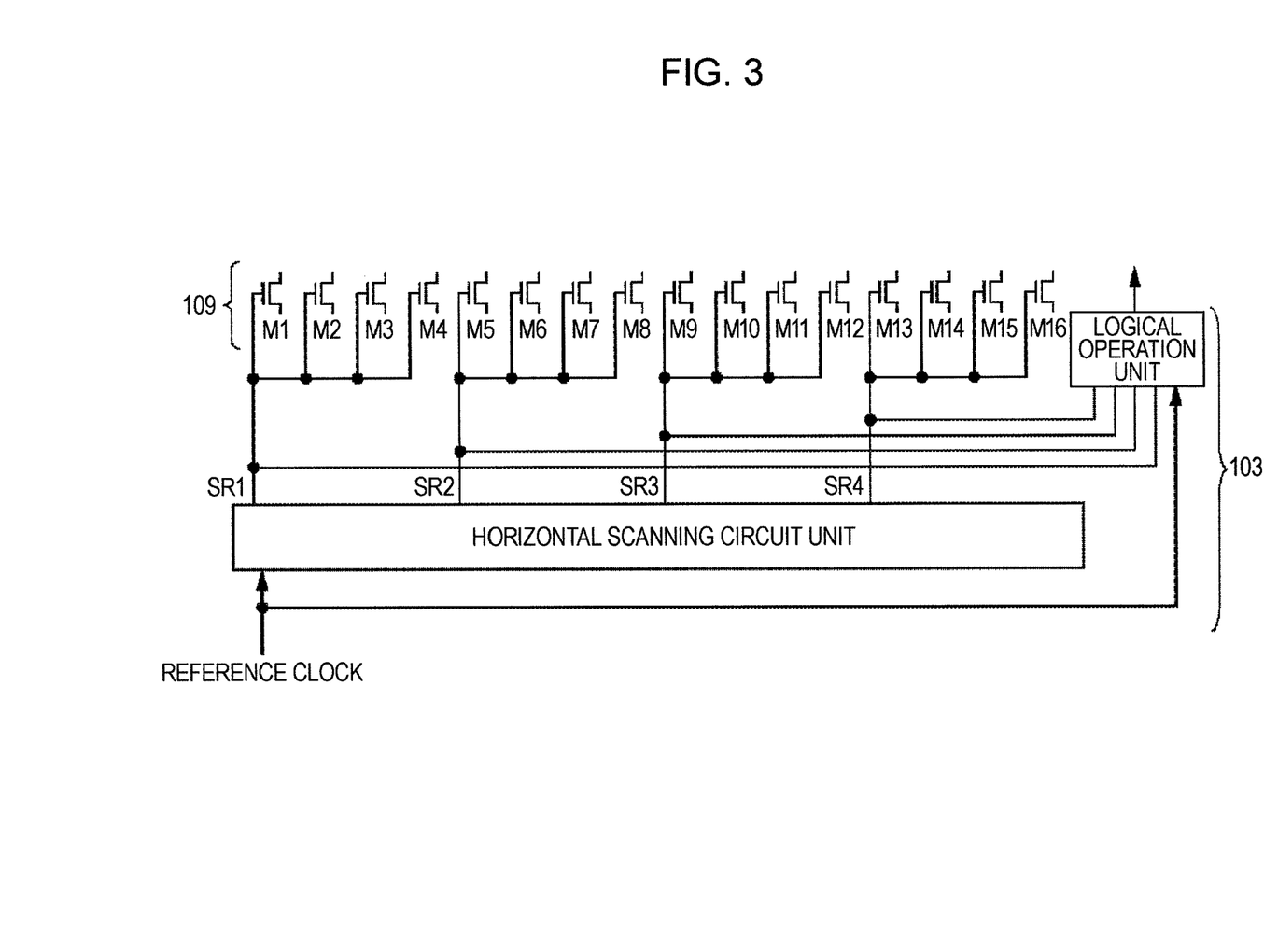
FIG. 3 is a schematic view of a horizontal scanning circuit according to a third exemplary embodiment of the present invention.

According to a third exemplary embodiment of the present invention, the horizontal scanning circuit 103 applicable to the first and example exemplary embodiments will be described. FIG. 3 illustrates an example of the configuration of the horizontal scanning circuit 103 in FIG. 6 in detail. The horizontal scanning circuit 103 to which a reference clock is input includes a scanning circuit unit, a logical operation unit, and a buffer circuit. The horizontal scanning circuit has terminals SR1, SR2, SR3, and SR4 corresponding to the block lines and a pulse is output from the terminal SR1, SR2, SR3, or SR4 in response to the reference clock. The pulse output from the horizontal scanning circuit is supplied to the logical operation unit along with the reference clock, and the drive pulses φCHR, φ123, φ124, φSW1, and φSW2 are output from the logical operation unit. Because the drive pulse φCHR is generated by using the pulses for opening and closing the switches in the switch group 109 in the third exemplary embodiment, it is possible to perform the reset operation at the right timing.

Fourth Exemplary Embodiment

Figure 4:
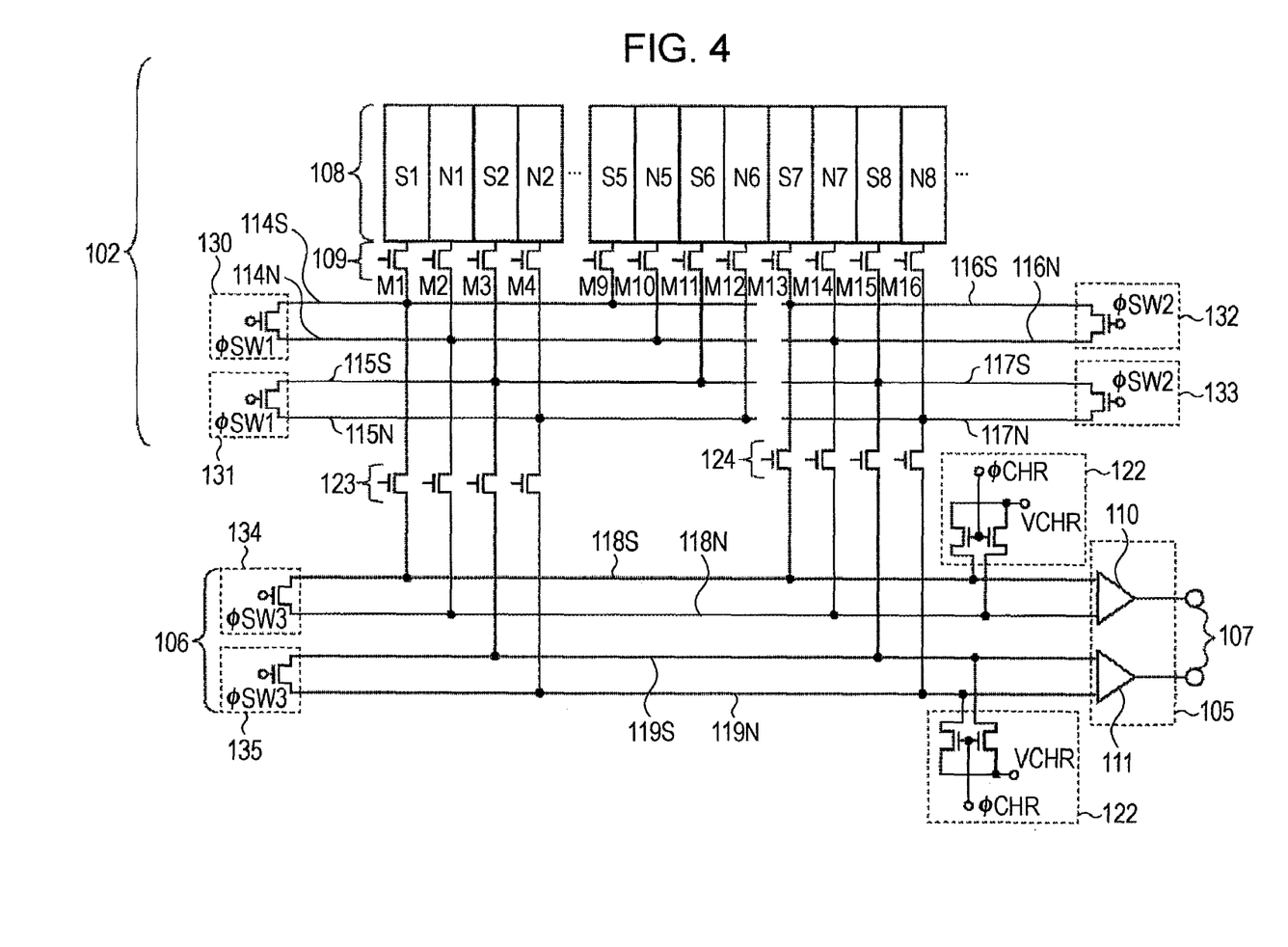
FIG. 4 is a schematic view for illustrating a fourth exemplary embodiment of the present invention.

A photoelectric conversion apparatus according to a fourth exemplary embodiment of the present invention will now be described with reference to FIG. 4. The same reference numerals are used in FIG. 4 to identify the same components shown in FIG. 1. The photoelectric conversion apparatus according to the fourth exemplary embodiment includes a switch 134 for establishing a connection between the common signal lines 118S and 118N and a switch 135 for establishing a connection between the common signal lines 119S and 119N, in addition to the components shown in FIG. 1. The switches 134 and 135 are included in a sixth switch block. The switches 134 and 135 are driven by using a drive pulse φSW3 that is the same as the drive pulse φCHR. With this configuration, it is possible to reduce the time necessary for the reset operation of the common signal lines and to decrease the resistance from the reset units to the block lines. Consequently, it is also possible to reduce the time necessary for the reset operation of the block lines.

Figure 5:
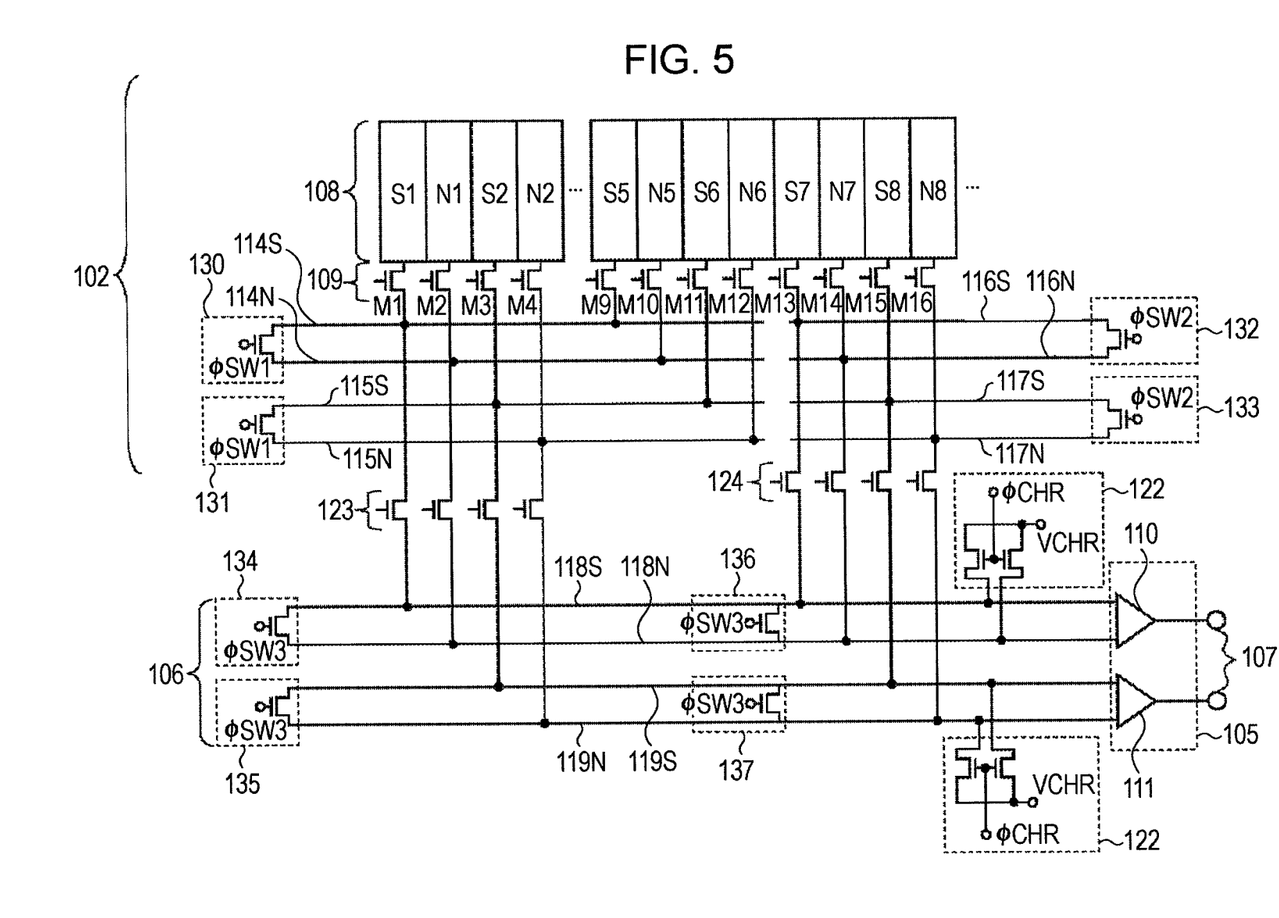
FIG. 5 is another schematic view for illustrating the fourth exemplary embodiment of the present invention.

The photoelectric conversion apparatus according to the fourth exemplary embodiment may be provided with switches 136 and 137 (the sixth switch block), as shown in FIG. 5. The switches 136 and 137 are respectively arranged between the arrangement of the reset units 122 and the switches 134 and 135, as shown in FIG. 5. With the above configuration, it is possible to further reduce the time necessary for the reset operation of the common signal lines. The switches 136 and 137 are also driven by using the drive pulse φSW3, which is the same as the drive pulse φCHR.

The provision of the switches 134 and 135 and the establishment of the connection between the switches 134 and 135 in the above manner allow the reset operation to be performed while averaging the electric charge when the signals are output between the paired common signal lines. Accordingly, the effect of the electric charge remaining after the reset operation can be suppressed and the electric charge when the signals are output can be discharged through the two common signal lines to reduce the time necessary for the reset operation. Also, even if the switches 130 to 133 for the block lines are not provided, the provision of the switches 134 to 137 for the common signal lines allows the reset time to be reduced to about 40% of the time necessary when the switches 134 and 135 are not provided.

Fifth Exemplary Embodiment

Application of the photoelectric conversion apparatus according to any of the first to third exemplary embodiments to an image pickup system, such as a digital still camera or a camcorder, will now be described in a fifth exemplary embodiment of the present invention. A digital still camera is used as the image pickup system according to the fifth exemplary embodiment.

Figure 7:
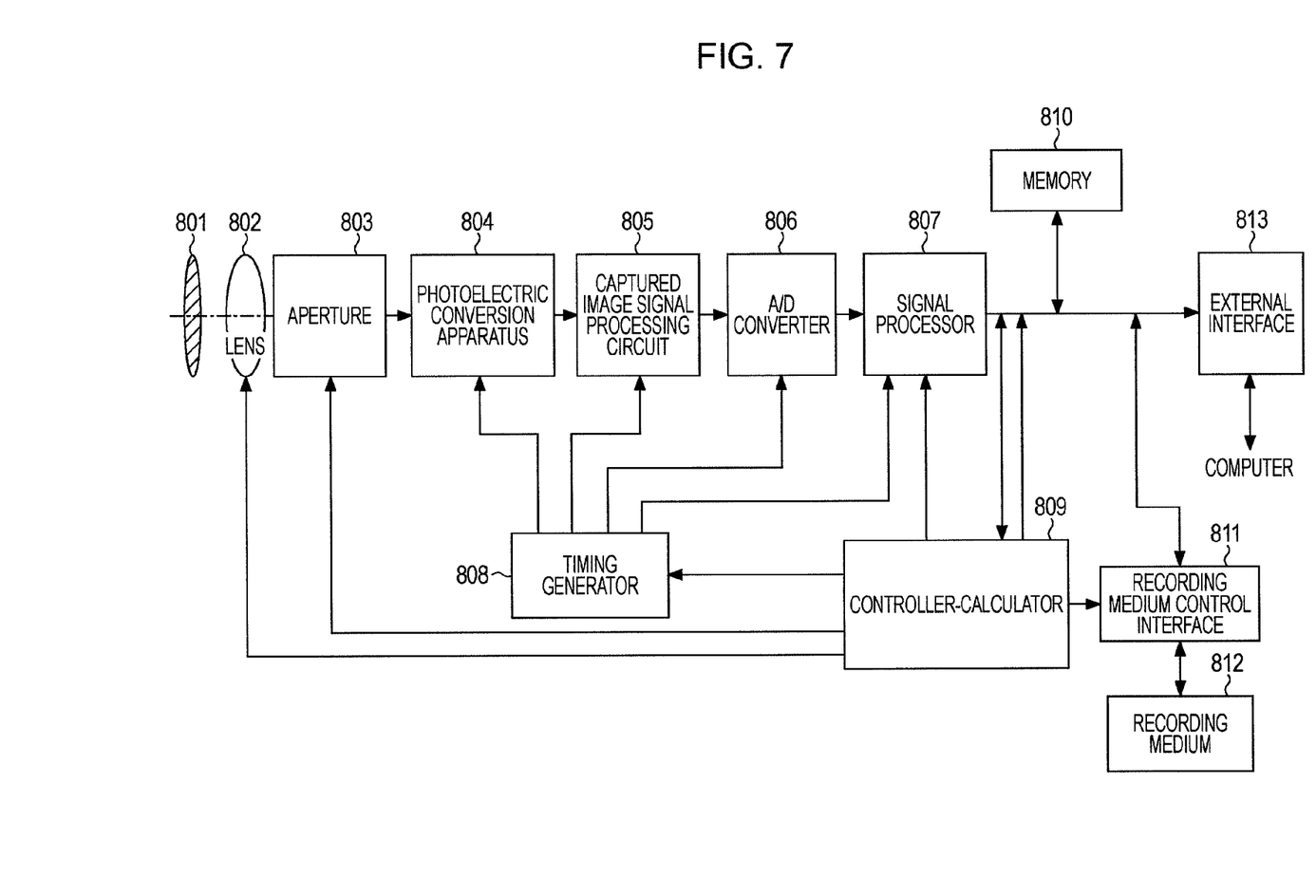
FIG. 7 is a block diagram showing an example of a configuration of an image pickup system according to a fifth exemplary embodiment of the present invention.

FIG. 7 is a block diagram showing an example of the configuration of a digital still camera. Referring to FIG. 7, an optical image of a subject is focused on the imaging plane of a photoelectric conversion device 804 by an optical unit including a lens 802 and so on. A barrier 801 having a function of protecting the lens 802 and serving as a main switch may be provided outside the lens 802. The lens 802 may be provided with an aperture 803 for adjusting the amount of light from the lens 802. Captured image signals are supplied from the photoelectric conversion device 804 to a captured image signal processing circuit 805 through multiple channels and are subjected to various corrections, clamping, etc., in a captured image signal processing circuit 805. The captured image signals are supplied from the captured image signal processing circuit 805 to an analog-to-digital (A/D) converter 806 through multiple channels and are subjected to analog-to-digital conversion in the analog-to-digital converter 806. The image data is supplied from the analog-to-digital converter 806 to a signal processor (image processor) 807 and is subjected to various corrections and data compression in the signal processor 807. The photoelectric conversion device 804, the captured image signal processing circuit 805, the analog-to-digital converter 806, and the signal processor 807 operate in response to timing signals generated by a timing generator 808.

The captured image signal processing circuit 805, the analog-to-digital converter 806, the signal processor 807, and the timing generator 808 may be formed on the same chip as that of the photoelectric conversion device 804. Each block is controlled by a controller-calculator 809. The digital still camera also includes a memory 810 for storing the image data and a recording medium control interface 811 through which images are recorded on or read out from a recording medium 812. The recording medium 812 may include, for example, a semiconductor memory, etc., and is removable from the digital still camera. The digital still camera may be provided with an external interface 813 for communication with an external computer or the like.

An exemplary operation of the digital still camera shown in FIG. 7 will now be described. When the barrier 801 is opened, a main power supply, a control power supply, and a power supply for the imaging circuits including the analog-to-digital converter 806 are sequentially turned on. Then, the controller-calculator 809 opens the aperture 803 to control the amount of exposure. A signal output from the photoelectric conversion device 804 passes through the captured image signal processing circuit 805 and is supplied to the analog-to-digital converter 806. The analog-to-digital converter 806 performs the analog-to-digital conversion to the signal and supplies the digital signal to the signal processor 807. The signal processor 807 processes the data and supplies the processed data to the controller-calculator 809 where the amount of exposure is calculated. The controller-calculator 809 controls the aperture 803 on the basis of the calculated amount of exposure.

Then, the controller-calculator 809 extracts a high-frequency component from the signal that is output from the photoelectric conversion device 804 and that is processed by the signal processor 807 to calculate the distance to the subject on the basis of the high-frequency component. The controller-calculator 809 drives the lens 802 to determine whether the digital still camera is in an in-focus state. If the controller-calculator 809 determines that the digital still camera is not in the in-focus state, the controller-calculator 809 drives the lens 802 again to calculate the distance to the subject.

After the in-focus state is confirmed, actual exposure is started. When the actual exposure is completed, a captured image signal output from the photoelectric conversion device 804 is subjected to the correction etc. in the captured image signal processing circuit 805, is subjected to the analog-to-digital conversion in the analog-to-digital converter 806, and is processed in the signal processor 807. The image data processed in the signal processor 807 is stored in the memory 810 by the controller-calculator 809.

The image data stored in the memory 810 is recorded on the recording medium 812 through the recording medium control interface 811 under the control of the controller-calculator 809. The image data may be supplied to a computer or the like through the external interface 813 and may be processed.

In the image pickup system described above, it is possible to reduce the time necessary for the reset operation and to output the image data at high speed. In addition, high-speed image display can be easily achieved. Since it is possible to provide enough time for the processing in the downstream captured image signal processing circuit 805, the analog-to-digital converter 806, and the signal processor 807, the image signals can be precisely generated.

Although the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-328724 filed Dec. 20, 2007, which is hereby incorporated by reference herein in its entirety.

What is claimed is:

1. A photoelectric conversion apparatus comprising:
a plurality of photoelectric conversion elements;
a plurality of signal lines to which signals from the plurality of photoelectric conversion elements are output;
a signal storage group including signal storage devices configured to store the signals output to the signal lines, wherein the signal storage group is grouped into a first signal storage block that includes signal storage devices storing signals based on electric charge generated in the photoelectric conversion elements and a second signal storage block that includes signal storage devices storing noise signals superimposed on the signals based on the electric charge generated in the photoelectric conversion elements;
a plurality of common signal lines to which the signals in the signal storage group are output;
a plurality of block lines to which the signals from the signal storage devices included in each block are read out;
a plurality of switches used to transfer the signals read out from the plurality of block lines to corresponding ones of the plurality of common signal lines; and
a reset unit configured to reset a voltage of the plurality of common signal lines to a reset voltage,
wherein the plurality of block lines includes a first block line to which signals from the signal storage devices in the first signal storage block are output and a second block line to which signals from the signal storage devices in the second signal storage block are output,
wherein the plurality of common signal lines includes a first common signal line to which the signals from the first block line are output and a second common signal line to which the signals from the second block line are output,
wherein the plurality of switches includes a first switch with which the first block line is connected to the first common signal line and a second switch with which the second block line is connected to the second common signal line, and
wherein the photoelectric conversion apparatus further includes a switch used to control a connection between the first block line and the second block line.

2. The photoelectric conversion apparatus according to claim 1, further comprising:
a switch used to control a connection between the first common signal line and the second common signal line.

3. The photoelectric conversion apparatus according to claim 1, further comprising a plurality of switches used to control a connection between the first common signal line and the second common signal line.

4. The photoelectric conversion apparatus according to claim 1,
wherein, at least after signals are read out from the signal storage devices in the first signal storage block and the signal storage devices in the second signal storage block, a period is provided during which a reset operation by the reset unit is performed in synchronization with the control of the connection between the first block line and the second block line.

5. A photoelectric conversion apparatus comprising:
photoelectric conversion elements;
a first signal readout unit including:
a first signal storage block that includes a plurality of memories for storing signals based on electric charge generated in the photoelectric conversion elements,
a first switch block that includes switches connected to the plurality of memories in the first signal storage block,
a first signal line block that includes signal lines to which the switches in the first switch block are connected,
a second signal line, and
a second switch block that includes switches with which the signal lines in the first signal line block are connected to the second signal line, the signals stored in the plurality of memories in the first signal storage block being selectively read out to the second signal line through the switches in the first switch block, the signal lines in the first signal line block, and the switches in the second switch block;
a second signal readout unit including:
a second signal storage block that includes a plurality of memories for storing noise signals superimposed on the signals based on the electric charge generated in the photoelectric conversion elements, a third switch block that includes switches connected to the plurality of memories in the second signal storage block, a third signal line block that includes signal lines to which the switches in the third switch block are connected, a fourth signal line, and a fourth switch block that includes switches with which the signal lines in the third signal line block are connected to the fourth signal line, the signals stored in the plurality of memories in the second signal storage block being selectively read out to the fourth signal line through the switches in the third switch block, the signal lines in the third signal line block, and the switches in the fourth switch block;

a reset unit configured to reset a voltage of the second signal line and the fourth signal line to a reset voltage; and a fifth switch block that includes switches used to control a connection between the signal lines in the first signal line block and the signal lines in the third signal line block.

6. The photoelectric conversion apparatus according to claim 5, further comprising:

a sixth switch used to control a connection between the second signal line and the fourth signal line.

7. The photoelectric conversion apparatus according to claim 6, wherein a plurality of sixth switches are provided.

8. A photoelectric conversion apparatus according to claim 1, wherein the photoelectric conversion apparatus is incorporated in an image pickup system that includes an image processing unit configured to process an image signal output from the photoelectric conversion apparatus.

9. A photoelectric conversion apparatus according to claim 5, wherein the photoelectric conversion apparatus is incorporated in an image pickup system that includes an image processing unit configured to process an image signal output from the photoelectric conversion apparatus.

* * * * *